Figure 1:
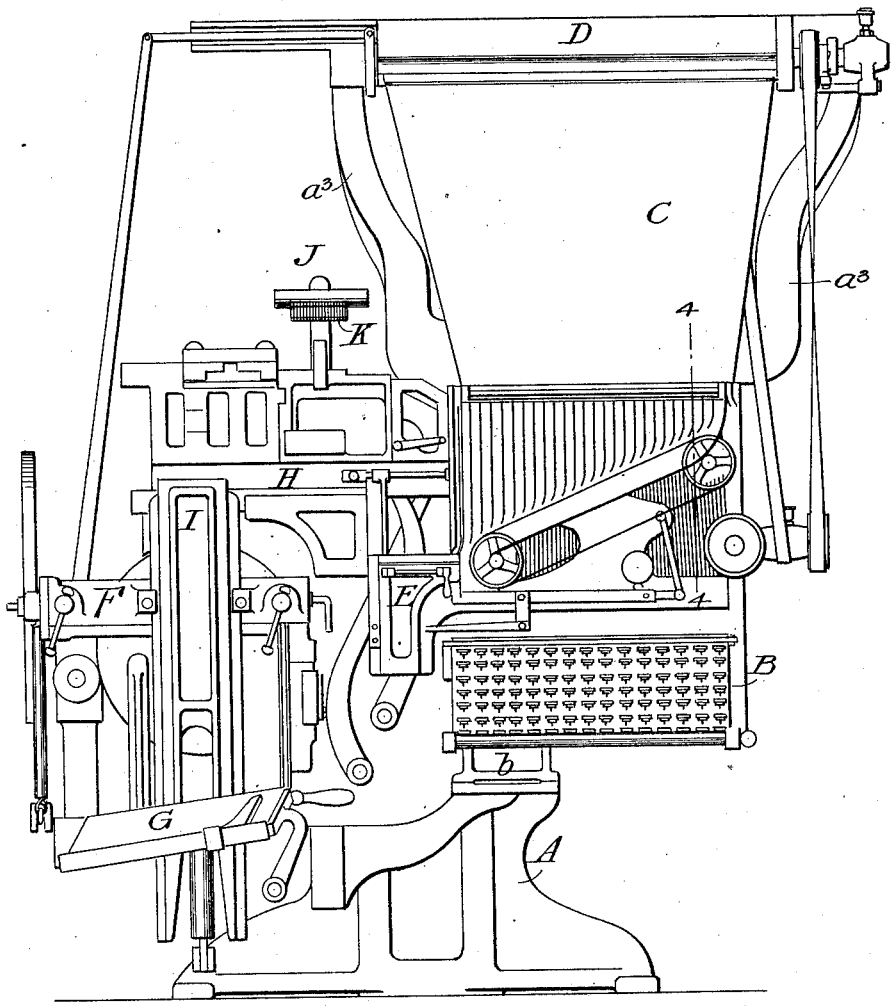

J. R. ROGERS.
LINE CASTING MACHINE.
APPLICATION FILED APR. 17, 1909.

1,002,320.

Patented Sept. 5, 1911.
5 SHEETS—SHEET 2.

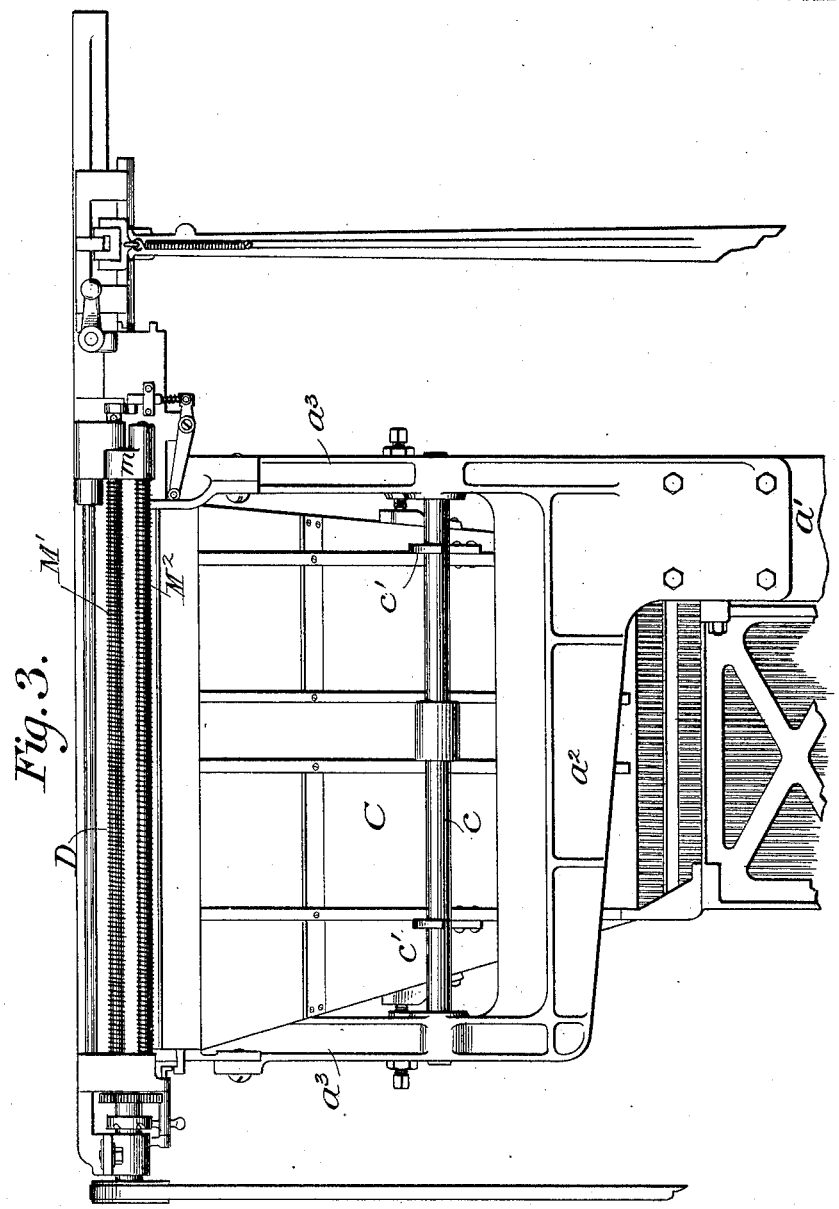

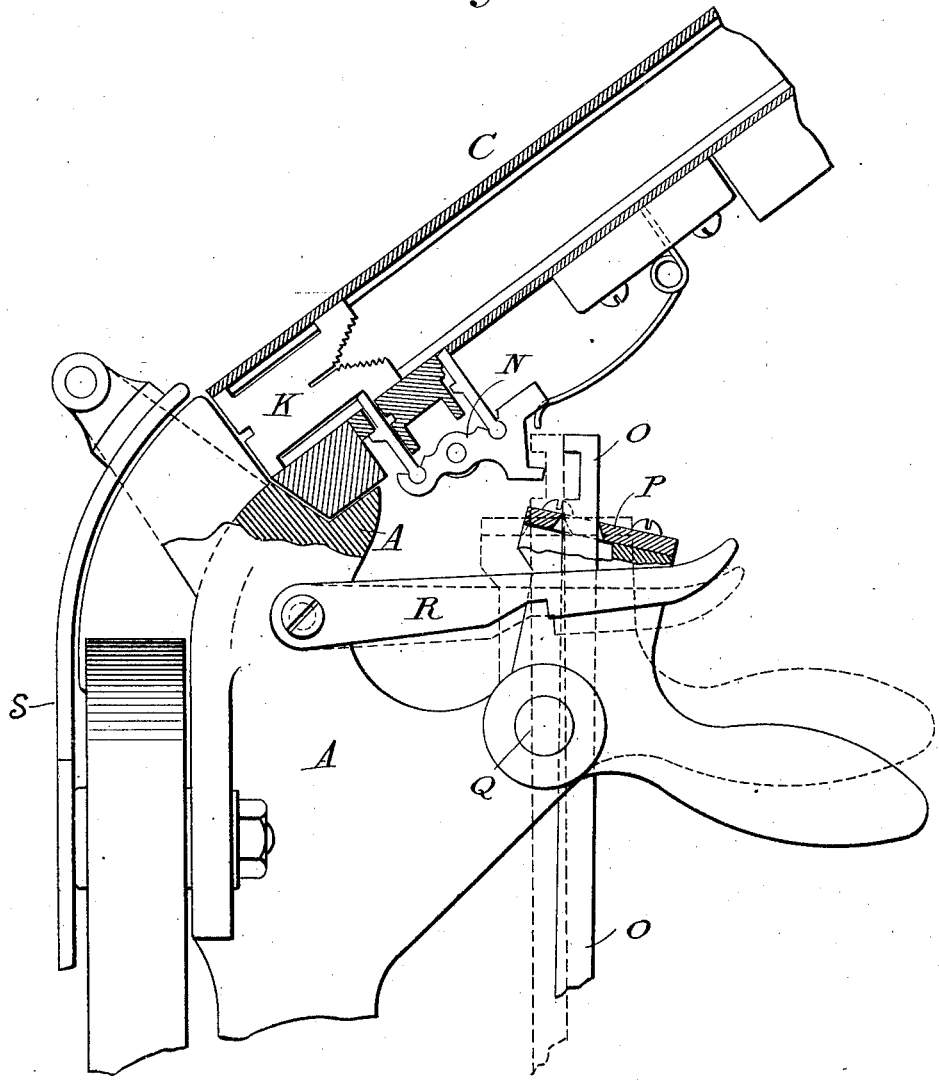

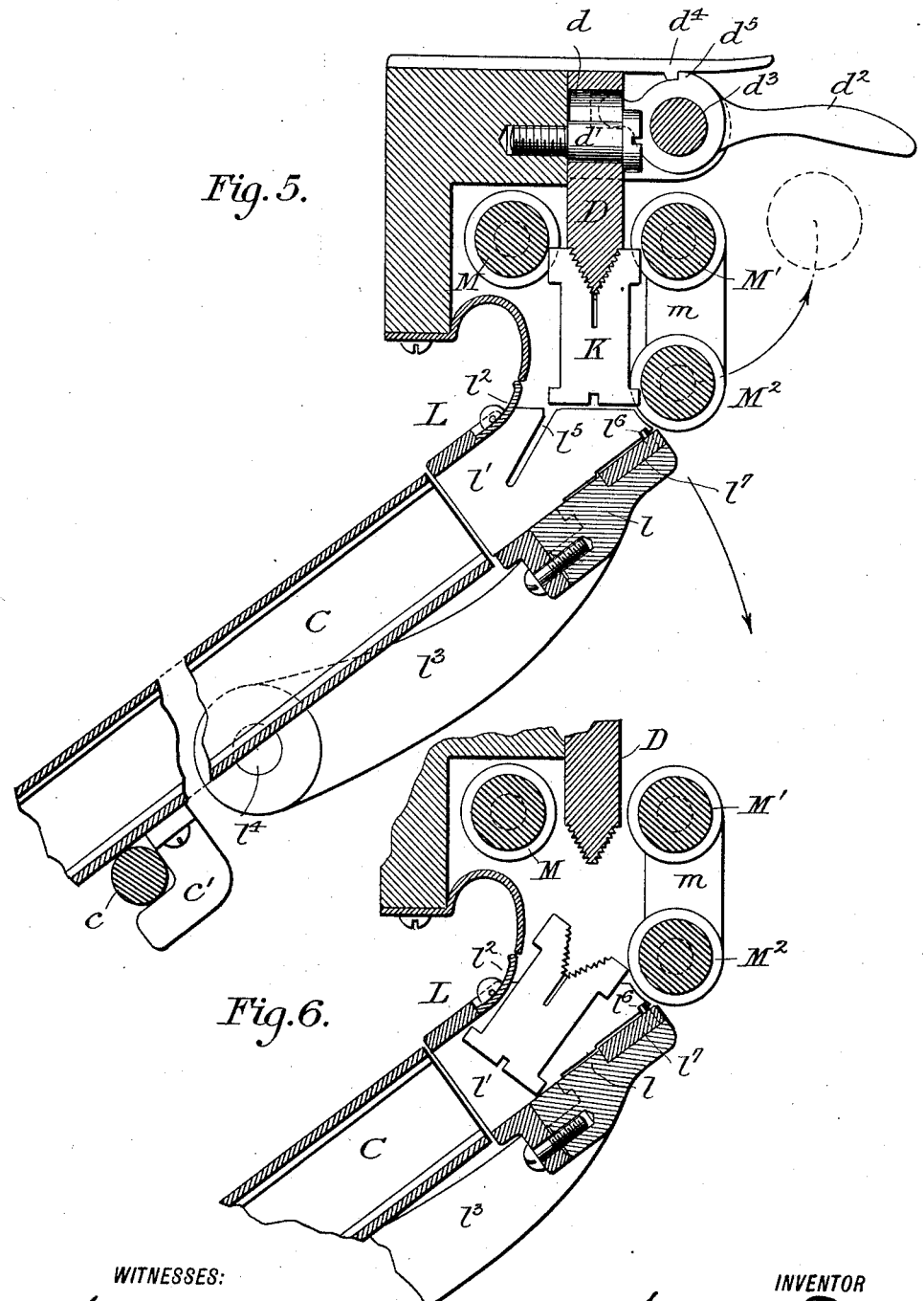

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

LINE-CASTING MACHINE.

1,002,320.  Specification of Letters Patent.  Patented Sept. 5, 1911.

Application filed April 17, 1909. Serial No. 490,440.

*To all whom it may concern:*

Be it known that I, JOHN R. ROGERS, of the borough of Brooklyn, county of Kings, and State of New York, have invented a new and useful Improvement in Line-Casting Machines, of which the following is a specification.

My invention has reference to machines of the general organization represented in Letters Patent of the United States to Mergenthaler, No. 436,532, intended for casting printing bars or slugs, and commercially known under the trademark "Linotype". In these machines a series of circulating matrices representing the various characters and spaces are stored in an inclined magazine, from which they are released, at the lower end, one at a time, by corresponding finger keys. The released matrices and spaces, together with the expanding spacers or justifiers, also released by finger keys, pass successively to an assembler, in which they are composed or assembled in line, each line containing the characters for one line of print. The composed lines are raised, transferred to the left and lowered to the face of a slotted mold, which is temporarily closed thereby, while molten metal is forcibly delivered thereto from a melting pot at the rear, to form in the mold the slug or linotype, on the front edge of which type characters are formed in relief by the matrices. After the casting action the composed line is lifted a certain distance and then transferred to the right to a "second elevator", so-called, which lifts the matrices to a distributing mechanism at the top of the machine, above the level of the magazine, while the expanding spacers, which remain behind, are transferred to the right into their magazine or holder. The elevated matrix line is shifted slowly to the right and the individual toothed matrices lifted one at a time from the line to horizontal feed screws by which they are carried along a horizontal toothed distributer bar. The teeth of the bar and the matrices bear such relations that each matrix is suspended during its travel and until it arrives over the appropriate magazine channel, into which it falls by gravity. In the practical operation of these machines it is frequently necessary, for one reason or another, to gain access to the distributing mechanism and the upper end of the magazine, and to view the interior of the latter. It is also necessary in certain classes of work to arrest the action of the machine and remove matrices from or apply them to the second elevator before it rises to the distributer. It is also necessary, from time to time, to adjust the left hand jaw by which the matrix line is confined at the casting position, for lines of different lengths.

As heretofore constructed the parts of the machine have been so shaped, proportioned and arranged that the distributing mechanism and the rear upper end of the magazine were more than six feet from the floor, so that the operator was required to mount a step or other support behind the machine in order to gain access to the distributing mechanism and the upper end of the magazine. The relation of the parts was such that it was also necessary for the operator to leave his seat in order to reach the second elevator or the confining jaw. It is also necessary in practice to remove the magazine and replace it by another containing matrices for a different type face.

In the machines as heretofore constructed the removal of the magazine was a laborious and somewhat dangerous operation, requiring the presence of two attendants. This was due to the fact that the rear end of the magazine was supported by a cross bar near its upper extremity and about six feet from the floor. The magazine, weighing, with the contained matrices, upward of one hundred pounds, required to be raised and passed backward over the supporting bar—one attendant standing in front of the machine to lift the forward end of the magazine and urge it backward, and the other standing at the rear to hold it in position until his companion passed to the rear of the machine when the magazine was removed by their joint effort.

In order to overcome the difficulties named I have substantially re-organized the machine, reconstructing and rearranging the various parts, and bringing the distributer and the upper end of the magazine down to such a height that they may be conveniently examined and inspected by an attendant standing on the floor; and I have so changed the supporting frame as to admit of the magazine supporting bar being greatly lowered and moved forward under the middle of the magazine, in order to admit of the magazine being tilted backward and downward over this bar and removed at a level so low that the operation can be performed by a single attendant standing behind the machine.

While retaining the keyboard at its original level, as required for convenient operation, I have lowered the assembling devices, the magazine, the spacer magazine, and the top of the vise frame in which the matrix confining jaws are located, so that the operator seated at the keyboard may conveniently reach and adjust the jaw, and conveniently reach the second elevator when slightly raised from its lowest position, for the purpose of applying or removing matrices.

In these machines as heretofore constructed the matrices falling from the distributer were received in the upper end of a throat or mouthpiece divided by vertical partitions and curved downward and forward to join the upper end of the magazine, into which it delivered the matrices. In the present organization, and as one of the means for effecting the reduction in height, I dispense with the curved throat and deliver the matrices directly into a straight throat forming a direct upward continuation of the magazine proper, so that the operator standing at the rear may look downward through the magazine and the throat without opening the latter or interrupting the distributing operation.

The matrix carrier screws of the distributer are three in number. Heretofore two of these screws were arranged in front of the distributer bar. I now change this arrangement by putting the two screws in the rear of the bar. This admits of the magazine being continued upward in a straight line, as described, in such proximity to the lower end of the pendent matrices that they may be delivered directly thereto and received in the channels almost immediately after being released from the bar.

Figure 2:
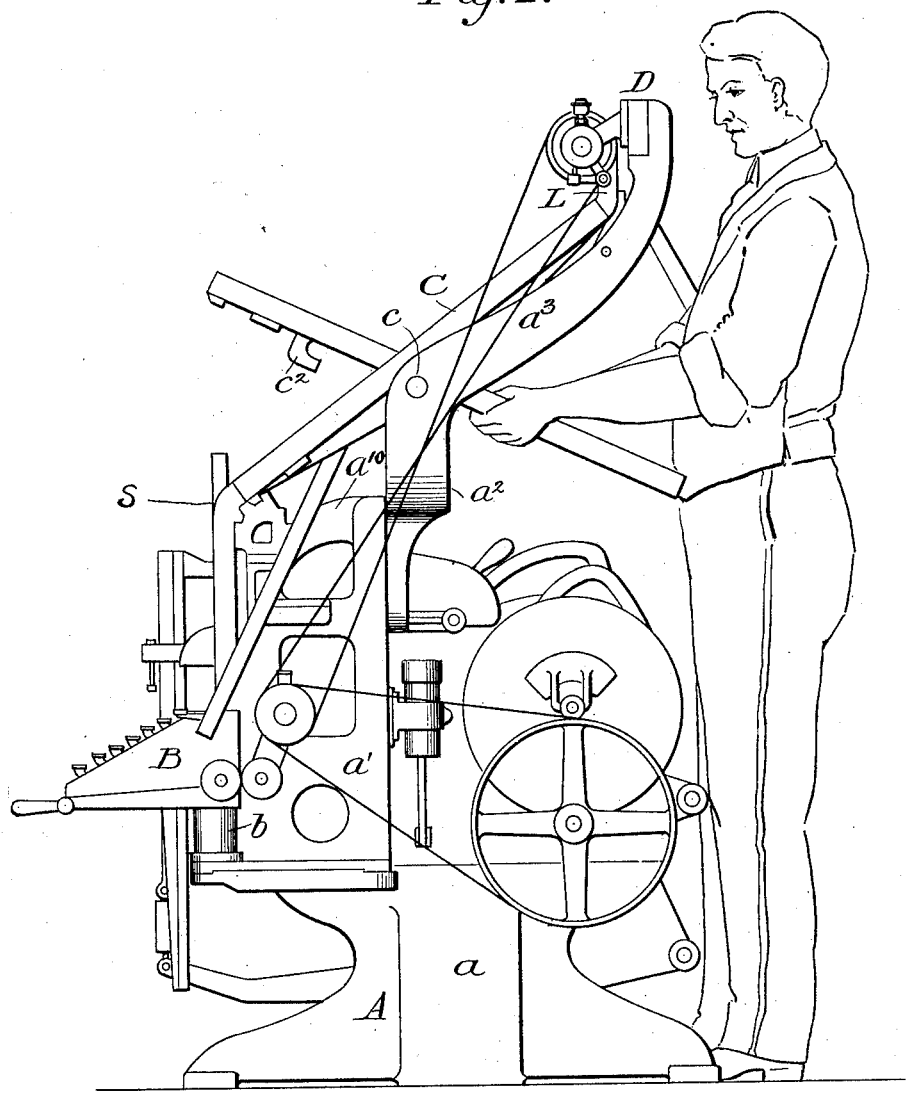

In the drawings: Figure 1 is a front elevation of a machine with my improvements incorporated therein. Fig. 2 is a side elevation of the same viewed from the right. Fig. 3 is a rear elevation of the upper part of the machine illustrating the manner in which the magazine is supported. Fig. 4 is a vertical section from front to rear through the lower end of the magazine and attendant parts, on the line 4—4, Fig. 1. Fig. 5 is a vertical section from front to rear through the distributing mechanism and the upper end of the magazine, with the parts in operative position. Fig. 6 is a similar view showing a matrix at an intermediate point in its course to the magazine.

Referring to the drawings, A represents the main frame of the machine, comprising the base $a$, and the column $a^1$ bolted upon its top to sustain the upper parts of the machine, including the bracket $a^2$, which supports the magazine and distributer.

B represents the keyboard mechanism, preferably of the construction shown in Letters Patent of the United States 530,931.

The base frame $a$, in which the main shaft and levers are mounted, is made much lower than heretofore, so that the column, magazine, and all the upper mechanisms of the machine are about one foot lower than was possible in the machine as formerly constructed.

In order to sustain the keyboard at the original level, a casting, $b$, is seated between it and the top of the base frame $a$, the parts being bolted or otherwise secured firmly together.

C represents the inclined channeled magazine to contain the matrices. It may be of essentially the same construction as those heretofore in use or of any special form hereinafter described. Instead of supporting this magazine by a rod near its upper end, it is now sustained upon a horizontal rod or cross bar $c$ located midway of the length of the magazine or thereabout, so that the magazine may be easily rocked or canted backward and downward over the bar by an attendant behind the machine preparatory to its removal therefrom.

In the original machine the supporting rod was located in the upper part of the bracket $a^2$, and near the upper end of the magazine, at the height of approximately six feet from the floor. Its location with reference to the magazine and its height from the floor were such that it was impossible for an attendant in the rear of the machine to balance the magazine backward over the bar. This was due not only to the height of the machine, but also to the fact that the supporting bracket $a^2$ and its sustaining column were so formed that the magazine could not be tipped downward at the rear until it had been first carried upward and rearward over the supporting bar.

As shown in Figs. 2 and 3, I form the bracket with a portion $a^{10}$ extending horizontally from the column $a^1$ beneath the magazine and with two upright arms $a^3$ at opposite sides of the magazine in position to sustain the ends of the rod $c$, the two arms being of such form as to embrace or straddle the magazine and admit of the latter being rocked backward at will. The top of the column is cut away or lowered at its top in relation to the level of the lower end of the magazine and the horizontal arm of the bracket $a^2$ located at such a low level, and so far forward under the magazine that the latter may be canted backward and downward over the support $c$ easily, and without interference on the part of the bracket or the column.

It is to be noted that the foregoing structure involves a material departure in the design, proportion and arrangement of the parts as compared with the machines of this class heretofore in use. The present is the first structure in which the height and form of the column and the form of the rod supporting bracket were such as to admit of the magazine supporting rod being lowered and moved forward to a position substantially under the middle of the magazine. It is the first structure in which the magazine could be canted rearward and removed over the rod at or near a middle point in its length.

As shown in Fig. 4, the forward end of the magazine which preponderates sligthly in weight over the rear end will rest upon, and be held in position by, the main frame A, either in the particular manner shown, or in any equivalent manner, this forming no essential part of the invention. The lower end of the magazine is in position to deliver the released matrices directly into the vertically channeled face plate S, fixed to the main frame as usual and serving to direct the matrices to the customary inclined belt T, by which they are delivered into the assembler E.

D represents the distributing mechanism, extending horizontally over the upper end of the magazine and sustained by the upper ends of the arms $a^3$ as shown. The upper end of the magazine, as shown in Fig. 5, lies directly beneath the distributing mechanism and in such relation thereto that the magazine may be removed or inserted without requiring the movement or adjustment of any portion of the distributer.

In practice I find that the location of the rod $c$ at a height of about 56 inches from the floor gives satisfactory results, and permits the magazine to be easily removed by a single attendant.

To aid in locating the magazine as it is applied to the machine, and to hold it in position, I commonly provide it on the under side with two hook shaped arms, $c^1$, to engage behind and beneath the supporting rod; and I also find it advantageous to provide the magazine on the under side, near the forward end, with one or more projections, $c^2$, preferably of hook form, to engage the rod $c$ as the magazine is withdrawn. These hooks prevent the magazine from escaping accidentally, and hold it temporarily, so that the operator may conveniently shift his hold thereon preparatory to lifting it from the machine.

When the machine organized as above is viewed from the front it will be seen that the assembling elevator, E, in which the matrix line is composed, stands but slightly above the level of the keyboard, and that the upper end of the vise frame, F, in which the line confining jaws are located, is slightly below the assembling level, while the slug-receiving galley, G, is located substantially below the level of the keyboard. The intermediate channel, H, to which the matrix line is delivered from the first elevator I, to engage the second elevator J, is located but a short distance above the level of the keyboard. This arrangement of the parts permits the operator seated at the keyboard to conveniently inspect and handle the type matter in the galley, to reach the top of the vise frame F at the outer side in order to adjust the jaw and to reach the second elevator J as it begins its ascent, in order to apply or remove matrices K.

The assembling mechanism, the elevators, the casting mechanism and the line transferring devices, may all be constructed and arranged to operate as heretofore, provided only that they are located in substantially the relation shown to each other and to the keyboard.

Passing now to the improved construction of the magazine and distributer, attention is directed to Figs. 5 and 6. C represents the body portion of the magazine, consisting as usual of two parallel plates having longitudinal grooves in their inner faces to guide the upper and lower edges of the matrices. D is the horizontal toothed distributer bar, of the ordinary construction, and L is an intermediate throat or guide which receives the matrices falling from the distributer bar and directs them into the upper end of the magazine. This throat, sometimes known as the channel entrance, forms an upward continuation of the magazine and is to all intents and purposes a part of the same, as it is adapted to retain one or more matrices opposite each channel of the magazine in the event of the channel being completely filled so that additional matrices cannot enter. The throat, instead of being made with a vertical curvature, as heretofore, consists of flat or straight top and bottom plates forming continuations of the magazine body, and intermediate vertical partitions $l^1$ secured thereto, the upper edges of these partitions being preferably secured to a connecting plate 1—2.

It will be observed that the bottom plate 1 of the throat has its flat upper surface arranged in line with or as a continuation of the bottom plate of the magazine, so that the matrix supporting or carrying surface from the upper end of the receiving throat to the lower end of the magazine is straight and uninterrupted. The upper ends of the partition plates $l^1$ are beveled or cut away horizontally, so that they project very slightly above the end of the bottom plate $l$. The distributer bar is arranged at such height that the lower ends of the matrices are carried closely over the upper edges of the plates $l^1$ and at a very short distance from the plate $l$, so that the matrices falling from the distributer bar are received almost instantly upon the inclined surface of the plate $l$, which acts to turn their lower ends forward in the manner shown in Fig. 6, the matrices being maintained on edge by a partition $l^1$ and directed downward into the upper end of the magazine. This arrangement of parts permits very speedy delivery of the matrices from the distributer into the magazine, so that in the event of matrices being released in rapid succession there is no danger of one matrix overtaking another, an occurrence which would be liable to cause their lodgment in the throat.

It will be observed that as the throat or member $l$ is straight and is arranged in line with the body of the magazine, the operator standing at the rear may look downward through the throat and magazine from one end to the other, and thus determine instantly, and without opening the throat whether the matrices are traveling in a proper manner and the location of any matrix which is displaced or improperly arrested. The essence of the invention in this regard lies in providing a straight path for the matrices from the point where they are received from the distributer to the point where they are delivered. In order to permit access to the interior of the magazine, the throat $l$ is preferably connected thereto or to any suitable support by sustaining arms $l^3$, fastened to the throat and pivoted at $l^4$, so that the throat may be swung downward away from the magazine and distributer at will.

The formation of the partitions and the location of the plate $l$ so that the matrices are received and guided at once, before they have fallen any great distance, and before they have acquired a high velocity, is of special importance in that it secures a smooth and easy action of the parts, prevents the corners or ears of the matrices from being battered, and also prevents the upper surface of the plate $l$ from being worn by contact of the matrices therewith.

The distributer and its teeth, and the matrices and their teeth, may be constructed as in the familiar Mergenthaler machine or in any other suitable manner; and indeed the bar D may be replaced by any other form of distributer which will carry the matrices over the partitions in the position indicated and drop them between the partitions into the throat.

The movement of the matrices along the distributer bar is effected, as heretofore, by three horizontal screws M, $M^1$ and $M^2$. The matrices may be delivered between the threads of the screws to the teeth of the distributer bar at one end, by the mechanism now in common use in Mergenthaler machines, or by any equivalent mechanism, these parts having no relation to my invention.

Heretofore the lower feed screw, $M^2$, has been located in front of the distributer bar, over the top of the magazine. In order to admit of the compact arrangement of the parts, and of the distributer being lowered so as to bring the lower ends of the matrices closer to the supporting surface which receives them, I have located the lower screw $M^2$ to the rear of the distributer bar, and over the outer or lower side of the throat L. The location of the screw in this new position is also advantageous in that it permits the matrices to fall freely and without interference, as shown in Fig. 6. It will be observed that if this screw were located at the front instead of at the rear it would be impossible for the matrices to follow the course indicated unless the distributer bar were located a greater distance above the receiving throat.

The partitions $l^1$ are made of thin, resilient material, their lower ends being seated immovably in grooves in the plate $l$. The upper ends of the partitions are divided by a slot, $l^5$, so that the lower and longer portion, between this slot and the plate $l$, may spring laterally in the event of a matrix lodging between them and being urged sidewise by the screws on top. These flexible ends of the partitions are seated against studs, $l^6$, secured in the bar $l^7$, which is seated in a groove in the upper surface of the plate $l$, so that it forms in effect a part thereof. In the event of a partition being forced sidewise by a lodged matrix it will act, through the adjacent pin, to move the bar $l^7$ endwise; and I propose to connect this bar at one end with means for throwing the distributer driving screws out of action in the same manner that this is now effected by a corresponding bar in the Mergenthaler machine. The construction of the clutch and its connection to the bar forms no part of my invention, and is familiar to every person skilled in the art.

It is sometimes desirable or necessary to remove a matrix from the distributer bar before it is discharged into the receiving throat. For this purpose I mount the screw $M^2$ in links, $m$, so that it may be swung backward and upward away from the matrices, as indicated by dotted lines; and I mount the distributer bar D so that it may be lowered at will in order to disengage the upper ends of the matrices from the screws M and M¹, so that after the matrix is disengaged from the bar by lateral movement thereon to the disengaging point, it may be removed rearward through the space afforded by swinging the screw M² out of the way; and this without opening the upper end or throat of the magazine.

The distributer bar may be supported and mounted as above indicated in any suitable manner, but I prefer to provide the bar with horizontal slots, $d$, and to secure it to the frame A by screws, $d^1$, passing through the slots. To sustain the bar in position and admit of its being lowered at will, I provide one or more levers, $d^2$, mounted on a horizontal rock shaft, $d^3$, seated in the main frame, the forward end of the lever being extended into a notch or slot in the distributer bar, so that by moving the lever the bar may be raised or lowered.

For the purpose of locking the bar in the elevated position I provide a spring latch, $d^4$, attached to the frame and arranged to engage a shoulder, $d^5$, on the lever.

To effect the release of the matrices one at a time from the magazine I employ an escapement mechanism, N, preferably of the usual form as shown in Fig. 4. These escapements are preferably secured to and removable with the magazine, and when so removable they are actuated by vertically sliding reeds, O, connected with the keyboard mechanism. In order that the reeds may be disengaged from the escapements preparatory to the removal of the magazine, I mount them in a movable guide, P, arranged to be rocked backward at will around a supporting shaft, Q, the parts being locked normally in their operative position by a latch, R. These parts are not claimed as part of the present invention.

It is to be observed that in organizing my machine for the removal of the magazine by a single attendant at the rear, I have not only lowered the support for the magazine, but moved it forward under the middle portion of the same, so that the magazine may be easily canted and balanced over the support. In this connection I have also modified the main frame and supporting bracket of the magazine, in order to give a clearance or space beneath the magazine, that it may be tilted to the horizontal position preparatory to its removal.

With respect to the magazine, it is to be noticed that the receiving end or mouth, being a continuation of the body portion, is in fact a part of the magazine; in other words, the magazine, considered as a whole, includes the body and the receiving mouth, or entrance, as it is commonly called, and it is in this sense that the word "magazine" is employed in the following claims, except where the contrary clearly appears.

Having thus described my invention, what I claim is:

1. In a line casting machine of the class described and in combination, the main frame, provided with the fixed face plate S and fixed distributer D, and the intermediate inclined magazine C, supported midway of its length on a rod $c$, said parts constructed and arranged as shown to admit of the magazine being balanced upon and rocked backward over said rod and then removed at the rear.

2. In a line casting machine of the class described, a main frame provided with a fixed face plate S, a fixed distributer D, and arms $a^3$, in combination with the inclined magazine C seated at its forward end on the frame, and the rod $c$ located in the frame midway of the length of the magazine and giving direct support thereto, said parts constructed and arranged as described to admit of the magazine being canted backward over said rod and withdrawn by an attendant standing in rear of the machine, without disturbance of the face plate or distributer.

3. In a line casting machine of the class described, an inclined magazine having a straight interior from end to end, thus affording an unobstructed inside view thereof, in combination with means for delivering matrices directly and vertically into the upper end.

4. In a line casting machine of the class described, a magazine having open ends and a straight interior from end to end, thus affording an unobstructed inside view thereof, and its receiving end being beveled, substantially as shown; whereby it is adapted to receive vertically falling matrices when mounted in an inclined position.

5. For a line casting machine of the class described, a magazine for use in an inclined position, having a straight, channeled body portion and a straight receiving end in line with the body, said end provided with vertical partitions, beveled on their upper edges at the receiving end.

6. In a line casting machine of the class described, the inclined magazine, having a straight matrix supporting surface from one extremity to the other, thus affording an unobstructed inside view thereof, in combination with the overlying distributer arranged to deliver matrices directly upon said surface, whereby the employment of inclined or curved guides to direct the matrices into the magazine is avoided.

7. In a line casting machine of the class described, in combination with the straight inclined magazine, the flexible partitions and a stop bar connected therewith, and the distributer bar arranged to drop the matrices directly into the upper end of the magazine.

8. In a line casting machine of the class described, in combination with the inclined magazine having the matrix supporting surface continued in a straight line to the upper end, thus affording an unobstructed inside view thereof, the overlying distributer bar, arranged to suspend the matrices directly over and in close proximity to the bottom plate of the magazine; whereby the magazine is adapted to receive and guide the matrices immediately after their release by the distributer.

9. In a line casting machine of the class described, in combination with the inclined magazine having a matrix supporting surface continued in a straight line to the upper end, and having the upper end beveled substantially as shown, the overlying distributer bar, the two feed screws located at the rear side of the distributer, and the single screw located in front of the same.

10. In a line casting machine of the class described, the inclined magazine continued in a straight line to its upper end, thus affording an unobstructed inside view thereof, in combination with the overlying distributer bar and screws arranged to carry the matrices immediately over and deliver them directly to the inclined surface of the magazine.

11. A magazine for line casting machines of the class described, comprising the straight channeled body portion and the straight movable section permanently connected thereto and formed at the receiving end to admit the matrices cornerwise, as described, and adapted to store matrices from one end to the other.

12. In a line casting machine of the class described, in combination, the inclined magazine, having its bottom plate continued in a straight line to its upper extremity, thus affording an unobstructed inside view thereof, and the distributer arranged to carry the matrices closely over the bottom plate and deliver them directly thereto.

13. In a line casting machine of the class described, the combination of the distributer bar, the magazine arranged to receive matrices directly from the bar, and the three feed screws located as shown, one in front and two in rear of the bar, the lower screw being mounted for a movement away from the matrices at the will of the attendant.

14. In a line casting machine of the class described, a support beneath the middle of the magazine, in combination with the inclined, removable magazine, adapted to be withdrawn rearward over the support and provided with suspending devices $c^2$ near its forward end to engage the support in the course of its removal.

15. In a line casting machine and in combination with a main frame and a distributer, a magazine extending downwardly from the distributer, and a fixed supporting member on the main frame giving direct support to the magazine when in normal position at a point about midway of its length, so that the magazine may be tilted directly downwardly over said support and its upper end thus be brought to a lower level, the said main frame being formed beneath the distributer to present a free unobstructed space for the direct passage of the magazine over the support.

16. In a line casting machine of the class described and in combination, the main frame, the fixed distributer, and the magazine below the distributer, the said frame being formed with means to give direct support to the magazine when in normal position midway of its length and the said parts being constructed and arranged to permit the magazine to be balanced upon said support during its passage into and out of operative position.

17. A magazine for line casting machines of the class described, having a straight interior from end to end, comprising a main portion and an upper portion, the upper portion being movably and permanently connected to the main portion, and adapted to store matrices from one end to the other.

18. A magazine for line casting machines of the class described, having a straight interior from end to end, comprising a main body portion and a movable throat permanently connected thereto, both portions being channeled so as to constitute straight and continuous paths from end to end for the matrices delivered into the throat, and adapted to store matrices from one end to the other.

19. In a line casting machine of the class described, the combination of a magazine with a magazine support, the said magazine being provided with a hook $c^1$ near its middle and an oppositely facing hook $c^2$ near its lower end.

20. In a line casting machine of the class described, the combination of a magazine with a magazine support, the said magazine being provided with a hook $c^1$ near its middle and a hook $c^2$ near its lower end to engage the said support according to the position of the magazine with reference thereto.

21. In a line casting machine of the class described, the combination of a magazine with a magazine support, the said magazine being provided with hooks located at different points in its extent and respectively adapted to engage the magazine support according to the position of the magazine with reference thereto.

22. In a line casting machine of the class described, the combination of a magazine with a magazine support, the said magazine being provided with oppositely facing hooks adapted to engage the support according to the position of the magazine with respect thereto.

23. The magazine for a linotype machine, provided with a hook $c^1$ near its middle and a hook $c^2$ near its forward end, together with a support adapted to be engaged by the respective hooks according to the position of the magazine with reference thereto.

In testimony whereof I hereunto set my hand this twentieth day of March, 1909, in the presence of two attesting witnesses.

JOHN R. ROGERS.

Witnesses:
DAVID S. KENNEDY,
LUCY E. SMITH.

Copies of this patent may be obtained for five cents each, by addressing the "Commissioner of Patents, Washington, D. C."